United States Patent [19]

Hyland et al.

[11] 4,086,399
[45] Apr. 25, 1978

[54] LAMINAR BATTERIES

[75] Inventors: Albert L. Hyland, Wayland; Robert G. Keene, Southborough, both of Mass.

[73] Assignee: Polaroid Corporation, Cambridge, Mass.

[21] Appl. No.: 782,836

[22] Filed: Mar. 30, 1977

[51] Int. Cl.² ............... H01M 2/00; H01M 6/12
[52] U.S. Cl. ............................ 429/122; 429/162
[58] Field of Search ............... 429/162, 152, 153, 160, 429/163, 178, 174, 185, 211, 122

[56] References Cited

U.S. PATENT DOCUMENTS

| 3,734,780 | 5/1973 | Bilhorn et al. | 429/162 |
| 4,019,251 | 4/1977 | McCole | 29/623.2 |

*Primary Examiner*—Anthony Skapars
*Attorney, Agent, or Firm*—John W. Ericson

[57] ABSTRACT

A thin, flat laminar battery having an end cell terminal assembly with a projecting tab substantially shorter than the side of the battery from which the tab projects. The tab is folded around the battery to bring the terminal into substantially the same plane as the opposite end terminal.

2 Claims, 6 Drawing Figures

LAMINAR BATTERIES

This invention relates to electrical cells and batteries, and particularly to a laminar battery having a novel terminal assembly.

Thin, flat laminar batteries are currently manufactured and sold as a component of the Polaroid SX-70 Land film pack, by Polaroid Corporation of Cambridge, Massachusetts. The battery serves as the power source for various automatic cameras adapted to accept the film pack, such as the Polaroid SX-70 Land Camera. One form of battery suited for this purpose, and its method of manufacture, are shown and described in U.S. Pat. No. 4,019,251, issued on Apr. 26, 1977 to Thomas P. McCole for Flat Battery and Method of Manufacture, assigned to the assignee of this application.

Reference is made to the above-cited U.S. Pat. No. 4,019,251 for details of the construction and manufacture of batteries of the kind here considered. Briefly, these batteries are made by assembling thin, flat laminar components including central active electrode regions in ionic communication through layers of gel electrolyte, and electronically connected in series through thin, flat conductive plastic intercell connectors and terminal collectors. The central active regions are surrounded by liquid impervious borders formed by interdigitating the conductive plastic layers with adhesive insulating layers, and sealing these border regions together with heat and pressure.

In order to effect the desired result of having both terminals accessible on the same side of the battery, for many years it has been the practice to form one end terminal with one side longer then the corresponding sides of the other laminae in the battery. This forms an extending terminal flap substantially coextensive with the length of that side of the battery, that is folded around the battery after sealing, being insulated from the opposite end terminal by an intermediate cardboard spacer, but to all intents and purposes in the same plane as the opposite end terminal because none of the laminae is more than a few mils in thickness.

By careful manufacturing and inspection procedures, excellent yields have been attained in the manufacture of batteries of the kind described in large quantities. However, from time to time defects have occurred which were not detected in inspection. The possible causes of defects in batteries are numerous, but most troublesome are those that result in defective seals, with consequent leakage of electrolyte that can lead to intercell shorting, external corrosion, and interbattery shorting in packaged lots, as well as the immediate deleterious effects on the leaking cell or cells. The objects of this invention are to reduce damage caused by leaking seals in laminar batteries, and to improve yields by early detection of defective seals so that causes can be found and remedial measures taken as soon as possible.

Briefly, the above and other objects of the invention are attained by limiting the length of the end flap to only a projecting tab to be folded around to bring the end terminal to the other side of the battery. This tab is coextensive with only a minor portion of the length of the side of the battery around which it is folded. It has been found that this simple expedient results in a surprising increase in quality in the final product, and a considerable reduction in the incidence of damage caused by leaking seals. While no theoretical explanation for this result can be offered with complete confidence, it does appear that a leaking seal under the terminal flap is considerably more destructive than one along any of the other three edges of the battery. One explanation that has been offered is that electrolyte slowly leaking from an exposed edge evaporates as it comes out, drying the leaking cell and shortening the life of the battery but doing no other significant damage. On the other hand, a slow leak under the flap may dry so slowly that the carrier web is permeated with liquid, increasing the rate of leakage by capillary action and promoting damage to adjacent materials, particularly adjacent batteries in packaged lots. Removing a substantial portion of the flap would therefore not only increase the probability of leak detection, but also reduce the damaging effects of leaks. Whatever the explanation, the improvement effected by cutting away most of the flap more than amply justifies this additional process step.

The invention will best be understood in the light of the following detailed description, together with the accompanying drawings, illustrative of the problem to which the invention is addressed and the apparatus of the invention in its preferred embodiment.

Figure 1:
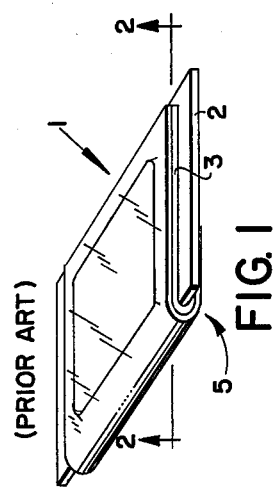
FIG. 1 is a schematic three quarter perspective sketch of a thin, flat laminar battery characteristic of the prior art.

FIG. 1 shows the external aspects of a prior art laminar battery 1, such as that described in U.S. Pat. No. 4,019,251 cited above, prior to final packaging. Central laminae of the battery are schematically indicated in block form at 2.

Figure 2:
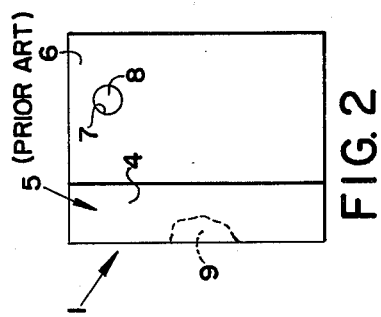
FIG. 2 is a schematic elevational bottom view of the battery of FIG. 1, taken substantially along the lines 2—2 in FIG. 1.

One external terminal of the battery 1 comprises a conductive plastic collector sheet 3 and an overlying metal terminal sheet 4 adhered thereto, which are formed with an end flap 5 initially extending beyond the other laminae and folded around to bring the surface of the external metal terminal 4 to the back of the battery, as shown in FIGS. 1 and 2. In order to insulate this terminal flap 5, it is laid over a kraft paper sheet 6. The sheet 6 is formed with an aperture 7 that serves to expose the metal terminal sheet 8 forming the opposite battery terminal. It will be apparent that a leak of electrolyte occurring under the flap 5, as suggested by the dotted lines at 9, will be completely concealed from view and and subject to propagation in the manner suggested above.

Figure 3:
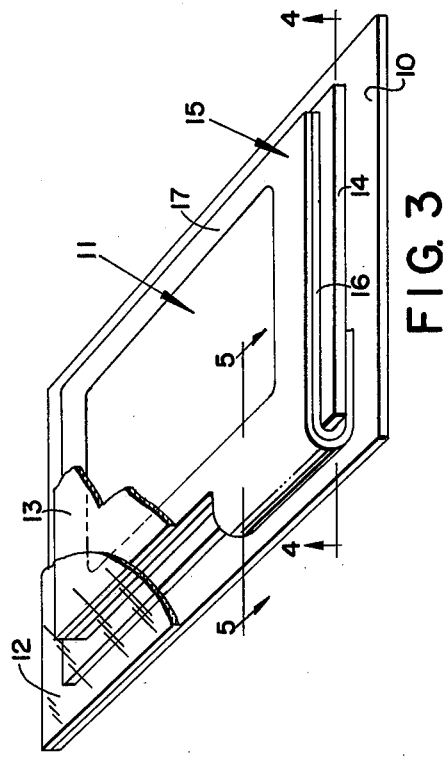
FIG. 3 is a schematic three quarter perspective sketch, with parts broken away, showing a battery in accordance with the invention as completely packaged.

FIG. 3 illustrates a construction of a battery in accordance with the invention. As is conventional, after sealing the battery is mounted on a thin cardboard locating sheet 10 that serves in a manner not here relevant to locate the battery in a film pack, and to assist in preventing its interaction with the film units with it is to be associated.

The battery itself, generally designated 11, is adhered by conventional means to the cardboard sheet 10 and lies between the sheet 10 and an overwrap web 12, of polyethylene or the like, which is adhered to the card stock 10. This overwrap may be, for example, 0.0015 inches thick.

The outer lamina of the battery 11 is a glassine web 0.002 inches thick, partially shown at 13, which is conventionally added in the manner and for the reasons set out in detail in U.S. Pat. No. 4,019,251, cited above, but which is not here relevant.

As in FIG. 1, laminae of the battery other than the anode terminal subassembly are shown in block form at 14. They will be identified in more detail below with reference to FIG. 5.

Figure 4:
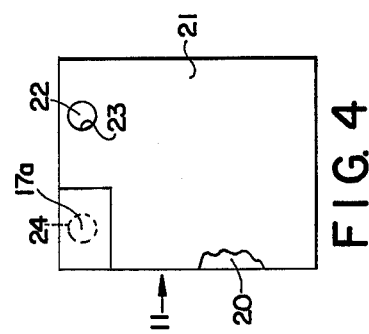
FIG. 4 is a schematic bottom view of the battery of FIG. 1 with base board and cover sheet removed, taken substantially along the lines 4—4 in FIG. 3.
Figure 5:
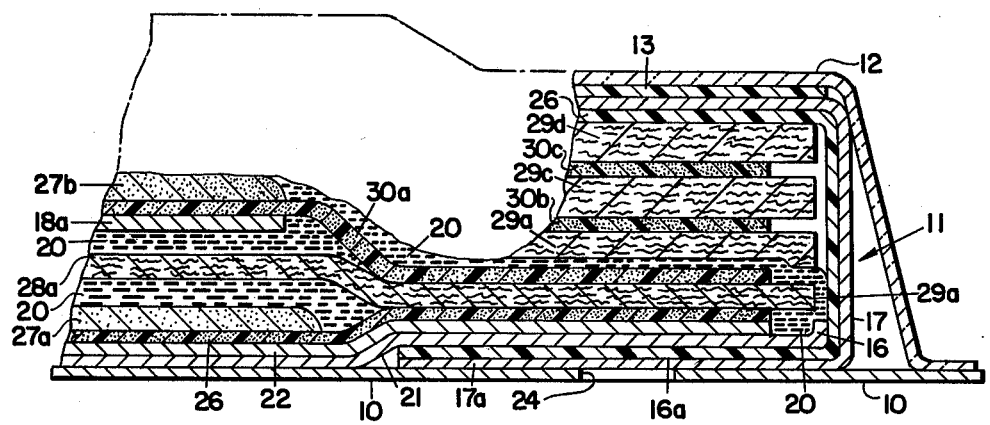
FIG. 5 is a schematic cross sectional elevational sketch, with parts shown in cross section and parts shown in phantom, on an enlarged scale, showing a typical portion of the battery of FIG. 3 as seen along the lines 5—5 in FIG. 3.
Figure 6:
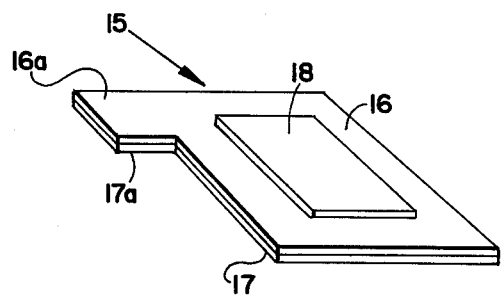
FIG. 6 is a schematic perspective three quarter view of an anode end terminal subassembly in accordance with the invention.

The anode terminal subassembly is generally designated 15, and is shown in its initial form, and inverted with respect to the showing in FIG. 3, in FIG. 6. Comparing FIGS. 3 and 6, the anode terminal subassembly comprises a conductive plastic anode current collector 16 laminated to a metal anode terminal layer 17. An anode patch 18, which may comprise a thin porous structure consisting of zinc powder in a polymeric binder and adhered thereby to the conductive plastic current collector 16, is formed in a central region on the main portion of the anode collector 16. As shown, the anode assembly 15 is generally L shaped in overall proportions and is formed with a projecting tab consisting of portions 16a and 17a of the current collector and terminal sheet, respectively, extending from one side of the body of the terminal assembly and adapted to be folded over the side of the battery as illustrated in FIGS. 3 and 4 and shown in more detail in FIG. 5. Referring to FIG. 4, it will be seen that any leak occurring in the region along most of the edge on which the fold 7a is located, for example, as indicated by the portion of gel electrolyte 20 shown in FIG. 4, is readily detected and will tend to evaporate as it is formed in the manner described above.

As described in connection with FIG. 2, the battery 11 is formed with a lower kraft paper sheet 21 that insulates the tab portion 17a and 16a from the anode collector terminal metal sheet 22 which is exposed through a port 23 formed for that purpose in the insulating paper sheet 21. The corresponding location of terminal access to the tab 17a is indicated by the dotted circle 24. This corresponds to a port 24 formed for that purpose in the cardstock 10, as best shown in FIG. 5. A corresponding port to the port 23, not shown, is formed in the cardstock 10 in registry with the port 23.

The tab portion 16a, 17a may extend out initially about 1 ⅛ inches from the main body of the battery, and down along the edge ¾ inch. This is in contrast to the prior art flap size of 1⅛ inch by 3½ inches.

FIG. 5 illustrates the internal construction of batteries of the kind here described in more detail, and illustrates the nature of the problem to which the invention is directed. Basically, as described in more detail in the above cited U.S. Pat. No. 4,019,251, the battery comprises a cathode terminal subassembly consisting of a metal cathode terminal sheet 21, such as a 2 mil thick sheet of tinned steel, aluminum or the like, laminated to a conductive plastic cathode collector sheet 26 on which there is formed a first cathode patch 27a, which may, for example, be 6 mils in thickness. Over this is a first layer 20 of gel electrolyte, and over the gel electrolyte a first of four separators, designated 28a, consisting of fibrous non-woven liquid permeable material, and filled at the edges with a hot melt polyamide adhesive to form a first frame 29a of four frames 29a, 29b, 29c and 29d.

Following another layer of gel electrolyte 20, there is a first of three duplex electrodes, consisting of a conductive plastic intercell connector 30 on the bottom of which is a anode layer 18a which is the same as the anode 18 in FIG. 6 and may be about 1 mil in thickness. The other side of the duplex electrode comprises a cathode layer 27b.

Overlying this first duplex electrode is another layer 20 of gel electrolyte. Additional features of the construction are essentially repetitive, and to the extent that they are not apparent from the above description may be gathered from the above cited U.S. Pat. No. 4,019,251. The point is that in the final sealing of the battery, in which the peripheral depression suggested in the drawings is produced, the object is to seal each of the conductive plastic and frame regions together to form a liquid impervious peripheral seal.

FIG. 5 suggests the problem that occurs when one or more of these seals is defective. As suggested between the frames 29a and 29b, a failure in the seal between the intercell connector 30a and the frame 29b allows a leakage of gel electrolyte, which may progress down into contact with the cardboard 21 and, if underlying the conductive plastic tab 16a and 17a, may be propagated and cause further leakage before it is dry. Thus, making the tab portions 16a and 17a as small as is consistent with their function greatly reduces the probability of damage from this cause. In fact, adoption of this expedient was found to reduce the incidence of charred batteries (caused by electrolyte shorts) from 0.0092 percent to 0.0014 percent, a reduction of 84 percent.

As a preferred practice, it is noted that rather than the conventional kraft paper used for the insulator and carrier web stock 21, a waterproofed material comprising 5 mil kraft paper coated on the side facing the battery 11 with a 1 mil coating of low density polyethylene overcoated with a half mil coating of extrudable heat seal material is presently preferred as the cardboard web material 21. This and other suitable materials for the purpose are more fully described in U.S. application Ser. No. 782,837 filed concurrently with the present application by Albert L. Hyland and Victor Michnick for Carrier Web for Laminar Batteries and assigned to the assignee of this application. As more fully described in that application, the use of this material considerably mitigates any damage that may occur upon leakage of the electrolyte 20, particularly in the vicinity of the fold tab 16a and 17a.

While the invention has been described with respect to the details of the preferred embodiment, many changes and variations will occur to those skilled in the art upon reading this description, and such can obviously be made without departing from the scope of the invention.

Having thus described the invention, what is claimed is:

1. An electrode terminal subassembly for use in the manufacture of laminar batteries and comprising a metal terminal sheet laminated to a conductive plastic current collector sheet, said sheets being formed with a generally rectangular body portion adapted to correspond with the major dimensions of the battery and a tab projecting from one side and adapted to be folded around the battery, said tab having a length substantially less than the length of said body portion, said current collector sheet having an electrode patch formed in a central region of the major rectangular portion of the sheet corresponding to the electrode region of the battery.

2. In a flat laminar battery of the kind in which one terminal has a flap that is folded over to permit access thereto on the same side of said battery as the other terminal, said flap being insulated from said other terminal by an insulating sheet comprising paper, the improvement wherein said flap covers only a minor portion of the length of the edge of the battery around which said flap is folded, thereby increasing the opportunity to inspect the battery for leakage and to allow the evaporation of any leakage that may occur.

* * * * *